Sept. 12, 1944. G. C. R. BIRCH 2,358,047
HYDRAULIC REMOTE INDICATING APPARATUS
Filed June 12, 1942
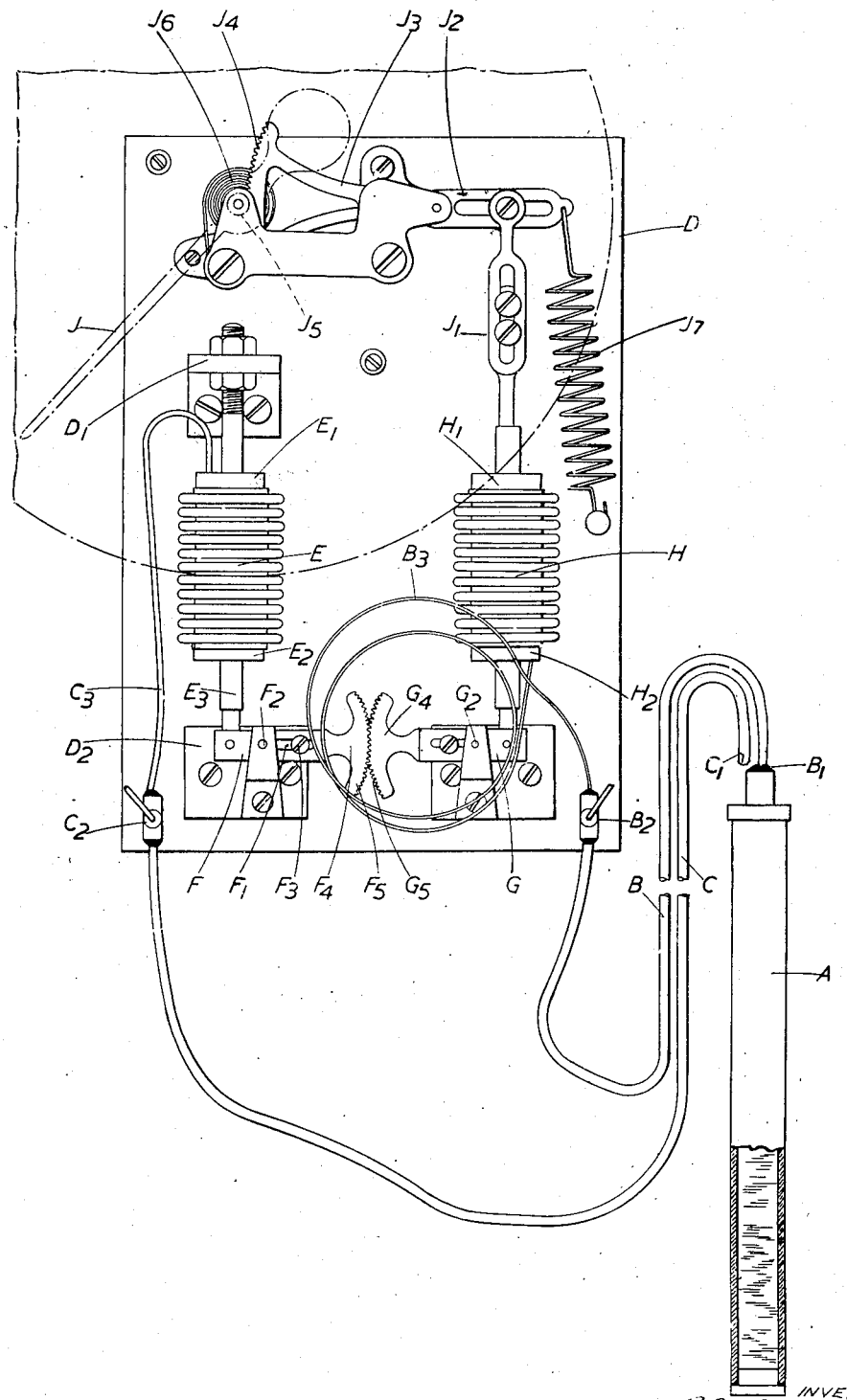
INVENTOR
G C R. BIRCH
BY Blair & Kilcoyne
ATTORNEYS Patented Sept. 12, 1944

2,358,047

UNITED STATES PATENT OFFICE 2,358,047

HYDRAULIC REMOTE INDICATING APPARATUS

George Christian Ross Birch, Raynes Park, England, assignor to B. & R. Patents Limited, London, England, a company of Great Britain Application June 12, 1942, Serial No. 446,826
In Great Britain July 16, 1941

6 Claims. (Cl. 73—370)

This invention relates to hydraulic remote indicating apparatus of the kind in which an indicator element is controlled by a bellows or like expansion chamber connected through a pipe to a device responsive to the quantity to be indicated, compensation for temperature expansion or contraction of the liquid in the pipe and bellows being afforded by a second similar bellows or like expansion chamber connected to a second pipe adjacent to the first pipe. Although not limited thereto, the invention is more particularly concerned with apparatus of this kind for indicating temperature, the device at the remote end of the pipe connected to the operating chamber consisting of a liquid-filled bulb exposed to the temperature to be measured.

In known apparatus of this kind the two bellows are arranged to expand toward one another, in opposite directions along parallel but offset axes, and are connected to the ends of a floating lever whose mid-point operates the indicator element. Thus with ambient temperature changes equal movements of the two bellows will cause the lever to swing about its mid-point without moving the indicator element, whilst a change in the bulb temperature or other quantity to be measured will affect only the operating bellows, the floating lever swinging about its point of connection to the compensating bellows and thus operating the indicator element.

Such an arrangement however introduces slight inaccuracies in the resultant indication owing to the fact that at different ambient temperatures the mid-point of the floating lever swings about different centres. If the floating lever were very long, so that its angular movement throughout the whole range of ambient temperature changes were small, these inaccuracies would be negligible. In practice, however, it is inconvenient to employ a long lever, and the present invention has for its object to provide an improved arrangement of hydraulic remote indicating apparatus of the above-mentioned kind, wherein such inaccuracies are avoided without the necessity for the use of a long floating lever. The arrangement according to the invention also has the advantage of providing a relatively robust indicating apparatus of simple construction not requiring any very high degree of accuracy in the manufacture of its parts or in the balancing of the operating and compensating hydraulic systems with one another.

Further objects of the invention will be apparent from the appended claims and from the accompanying drawing which illustrates by way of example a preferred practical construction of liquid expansion thermometer according thereto, wherein the thermometer bulb A, which is exposed to the temperature to be measured, is connected to the indicating point by a long thin-walled metal capillary tube B, and a second similar capillary tube C extends along the whole length of the first and is sealed at its end $C^1$ adjacent to the connection $B^1$ of the first tube B to the bulb A.

The apparatus at the indicating end is mounted on a suitable base D, which for convenience of description will be assumed to consist of a flat board mounted vertically although it may be arranged in other ways. The two capillary tubes B C are connected at their ends to junction pieces $B^2$ $C^2$ fixed to the bottom of the board D, and from one of these junction pieces $C^2$ (namely that connected to the compensating capillary tube C) a short pipe $C^3$ leads to the upper end cover plate $E^1$ of a vertically mounted metal bellows E, this cover plate being supported on a bracket $D^1$ fixed to the board D near one side edge thereof.

The lower end cover plate $E^2$ of this compensating bellows E carries an arm $E^3$ pivoted to one end of a short lever arm F having a horizontal slot $F^1$ which can slide past a pivot pin $F^2$ on a bracket $D^2$ fixed to the base board. This lever arm F can be clamped by a clamping screw $F^3$ in any desired position of adjustment to a second lever arm $F^4$ pivoted about the pin $F^2$, and this second lever arm $F^4$ carries a segmental toothed rack $F^5$ centred about the pin.

This rack $F^5$ engages with a similar rack $G^5$ on a lever arm $G^4$ which is pivoted about another fixed pin $G^2$ and to which a slotted lever arm G can be clamped in any position of adjustment, this slotted lever arm G being connected to the lower end cover plate $H^2$ of the operating bellows H. The two lever and rack mechanisms are similar to one another and act to ensure that, when they are similarly adjusted, any movement of the lower end of one bellows must be accompanied by an exactly similar movement of the lower end of the other bellows.

The upper end cover plate $H^1$ of the operating bellows H is not fixed but is connected to the indicator pointer J, and since both ends of this bellows are movable, it is necessary to employ a slightly flexible connection from the junction piece $B^2$ connected to the operating capillary tube B. This is achieved by the use of a coil $B^3$ of fine capillary tubing, the internal diameter of which is considerably smaller than that of the short pipe $C^3$ from the other junction piece $C^2$ to compensate for the difference in length between them, so that they shall both contain approximately the same volume of liquid.

The upper end cover plate $H^1$ of this bellows H is connected by a vertical link $J^1$ (of adjustable length) whose upper end can be clamped in any chosen position in a horizontal slot $J^2$ in one arm of a two-armed lever $J^3$. The other arm of this lever $J^3$ carries a segmental rack $J^4$ engaging with a small pinion $J^5$ directly mounted on the indicator pointer shaft. The provision of the slot $J^2$ in the lever arm permits adjustment to suit any desired ratio between the bellows movement and the pointer movement, so that the same apparatus can be employed for various ranges of temperature indication, with appropriately calibrated scales. In order to prevent backlash in the movement a light spiral spring $J^6$ is provided on the pointer shaft, and a more powerful helical spring $J^7$ acts on the horizontally slotted lever arm $J^3$ to give a smooth and steady pointer movement. The range of temperature which can be indicated is limited only by such factors as the boiling and freezing points of the liquid employed and the length and expansibility of the bellows, and it will readily be appreciated that, with suitable adjustment of the horizontally slotted arm $J^3$, a good wide-open substantially even scale can be obtained for any desired temperature range for which liquids are available, as may be required for the particular purpose for which the thermometer is to be used.

In order to reduce the total quantity of liquid in each bellows H or E one of the cover plates $H^2$ or $E^2$ may be cup shaped, so that when the bellows is collapsed to its minimum size the base of this cup comes nearly into contact with the other cover plate $H^1$ or $E^1$, the bellows thus still being capable of its full range of movement.

Assuming that the two hydraulic systems, each comprising capillary tube and bellows, are exactly similar to one another and the two lever mechanisms below the bellows are similarly adjusted, it will be clear that an ambient temperature increase will cause the compensating bellows E to expand downwards, the mechanism causing the lower end of the operating bellows H to move downwards by the same amount. Since however the expansions of both bellows will be equal, the upper end of the operating bellows H will remain stationary and the pointer J will remain unaffected. This will of course apply equally to a decrease in ambient temperature, and also to local temperature changes which affect only a part of the two systems.

If however the two hydraulic systems are not quite similar, the movements of the two bellows will be slightly different, but since the expansion law is a linear law, the movements will be proportional to one another and can be exactly corrected by appropriate adjustment of the lever mechanisms.

The arrangement also affords compensation for any difference of static head being the ends of the apparatus, since this will affect the two systems equally and will therefore have no effect except to alter the positions of the lower ends of the two bellows.

A change in the temperature to be measured on the other hand will cause expansion only of the operating bellows H and since the lower end of such bellows will be held stationary by the compensating bellows E, its upper end will move through the appropriate distance and will operate the pointer J.

It will be appreciated that the foregoing arrangement has been described by way of example only and may be modified in various ways within the scope of the invention, and that the invention may be applied to purposes other than temperature measurement.

What I claim as my invention and desire to secure by Letters Patent is:

1. Hydraulic remote indicating apparatus comprising in combination a closed hydraulic system consisting of a device responsive to the quantity to be indicated, a longitudinally expansible chamber and a pipe connecting the device and the chamber, a second closed hydraulic system consisting of a second longitudinally expansible chamber disposed side by side with the first and a second pipe extending from such chamber closely adjacent to the first pipe, an indicator element, means for operatively connecting such element to one end of one chamber, means for fixing the corresponding end of the other chamber, and mechanism interconnecting the other ends of said chambers for constraining one to follow the movement of the other in the same direction at proportional speed.

2. Hydraulic remote indicating apparatus as claimed in claim 1, in which the interconnecting device incorporates means for varying the relative position of associated parts of said interconnecting mechanism to adjust the transmission ratio thereof to vary the ratio between the speeds of the two chamber ends.

3. Hydraulic remote indicating apparatus as claimed in claim 1, in which the interconnecting device comprises a pair of pivoted levers respectively connected to the chamber ends, and a pair of intermeshing segmental racks respectively carried by the two levers.

4. Hydraulic remote indicating apparatus as claimed in claim 1, in which the interconnecting device comprises a pair of pivoted levers of adjustable lever ratio respectively connected to the chamber ends, and a pair of intermeshing segmental racks respectively carried by the two levers.

5. Hydraulic remote indicating apparatus comprising in combination a closed hydraulic system consisting of a device responsive to the quantity to be indicated, an expansible bellows and a pipe connecting the device and the bellows, an indicator element, means for operatively connecting the forward end of the said bellows to such element, means for compensating for ambient temperature variations comprising a second bellows similar to the first and disposed side by side therewith with its forward end fixed, a second pipe extending closely adjacent to the first pipe and constituting with the second bellows a second closed hydraulic system, mechanism interconnecting the other ends of the two chambers for constraining their movements relative to one another whereby the two chamber ends can only move in the same direction at the same proportional speeds, and means associated with said mechanism for varying the relative positions of associated parts thereof to adjust the transmission ratio to accommodate any differences between the quantities of liquid in the two hydraulic systems whereby the forward end of the first bellows remains unaffected by ambient temperature changes, and moves only in response to changes in the quantity to be indicated.

6. Hydraulic remote indicating apparatus as claimed in claim 5, in which the adjustable interconnecting device comprises a pair of similar pivoted levers of adjustable lever ratio respectively connected to the rearward ends of the two bellows, and a pair of similar intermeshing segmental racks respectively carried by the two levers.

GEORGE CHRISTIAN ROSS BIRCH.